F. M. JOSLIN.
PAPER BOX MACHINE.
APPLICATION FILED DEC. 26, 1914.
1,356,771.
Patented Oct. 26, 1920.
4 SHEETS—SHEET 4.
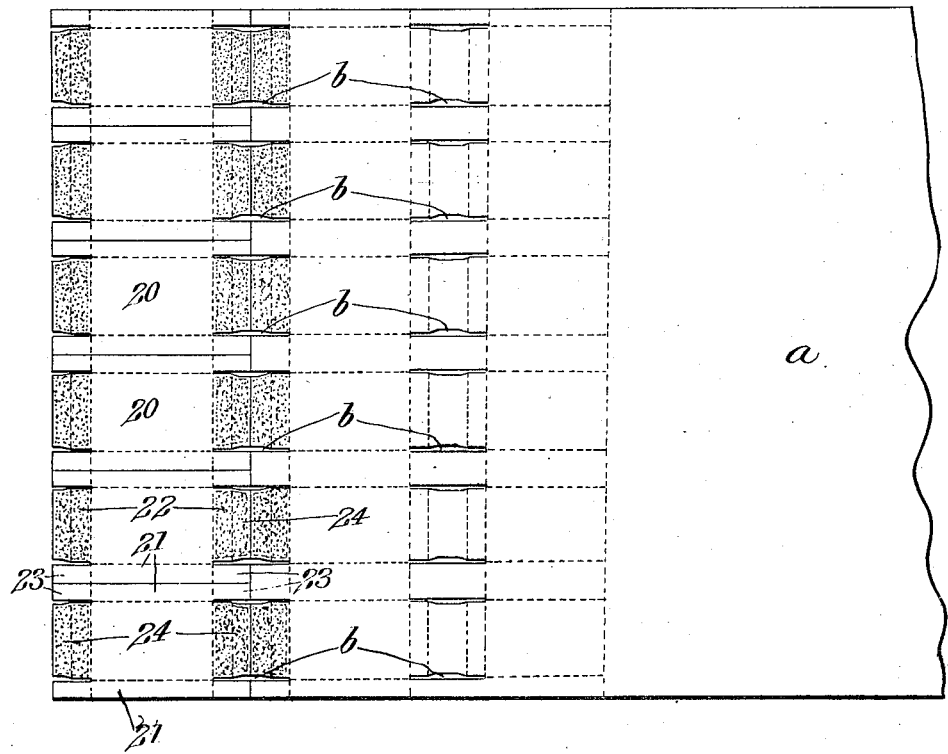
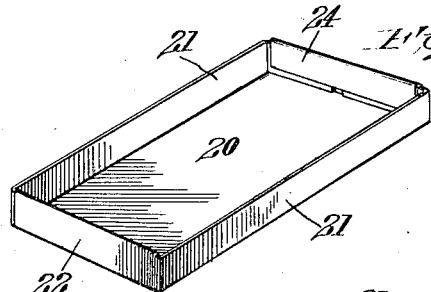
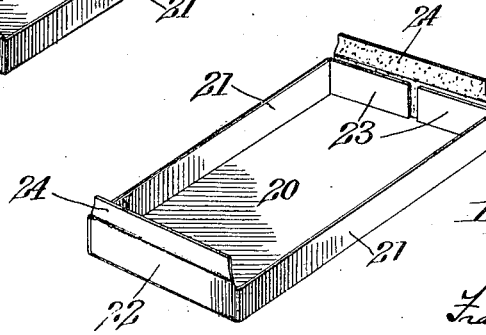
Witnesses
G. F. Baker
B. M. Kent
Inventor
Frank M. Joslin
by Foster Freeman Watson Stort
Attorneys

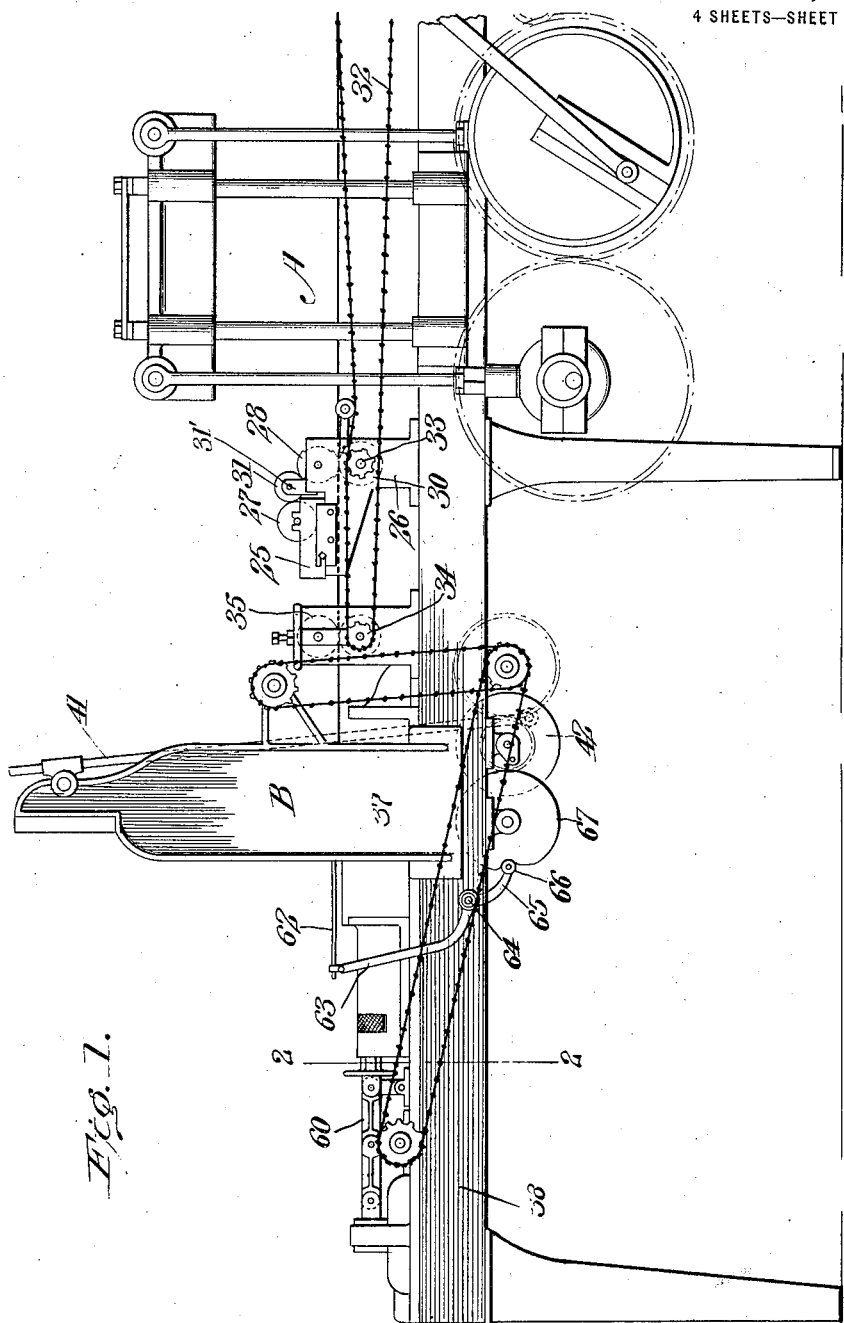

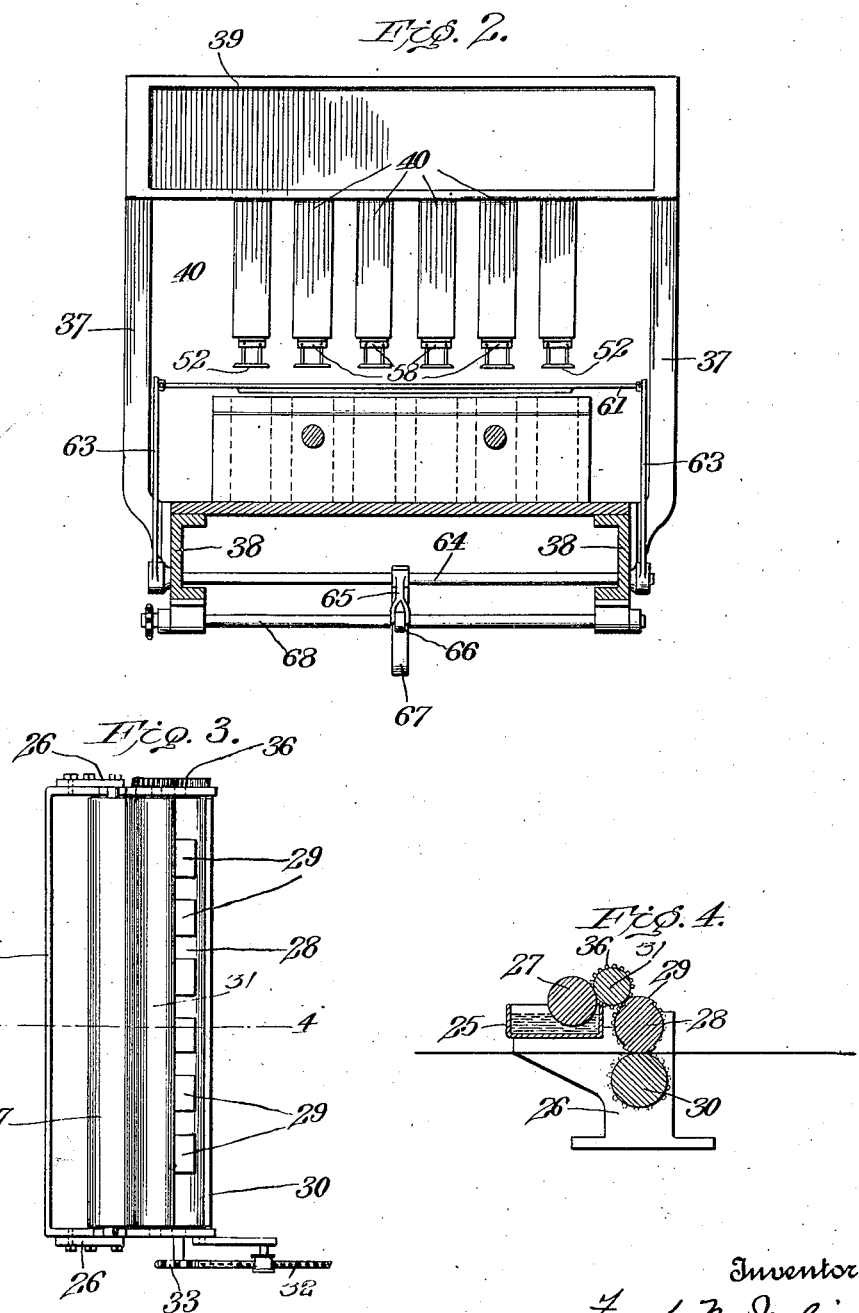

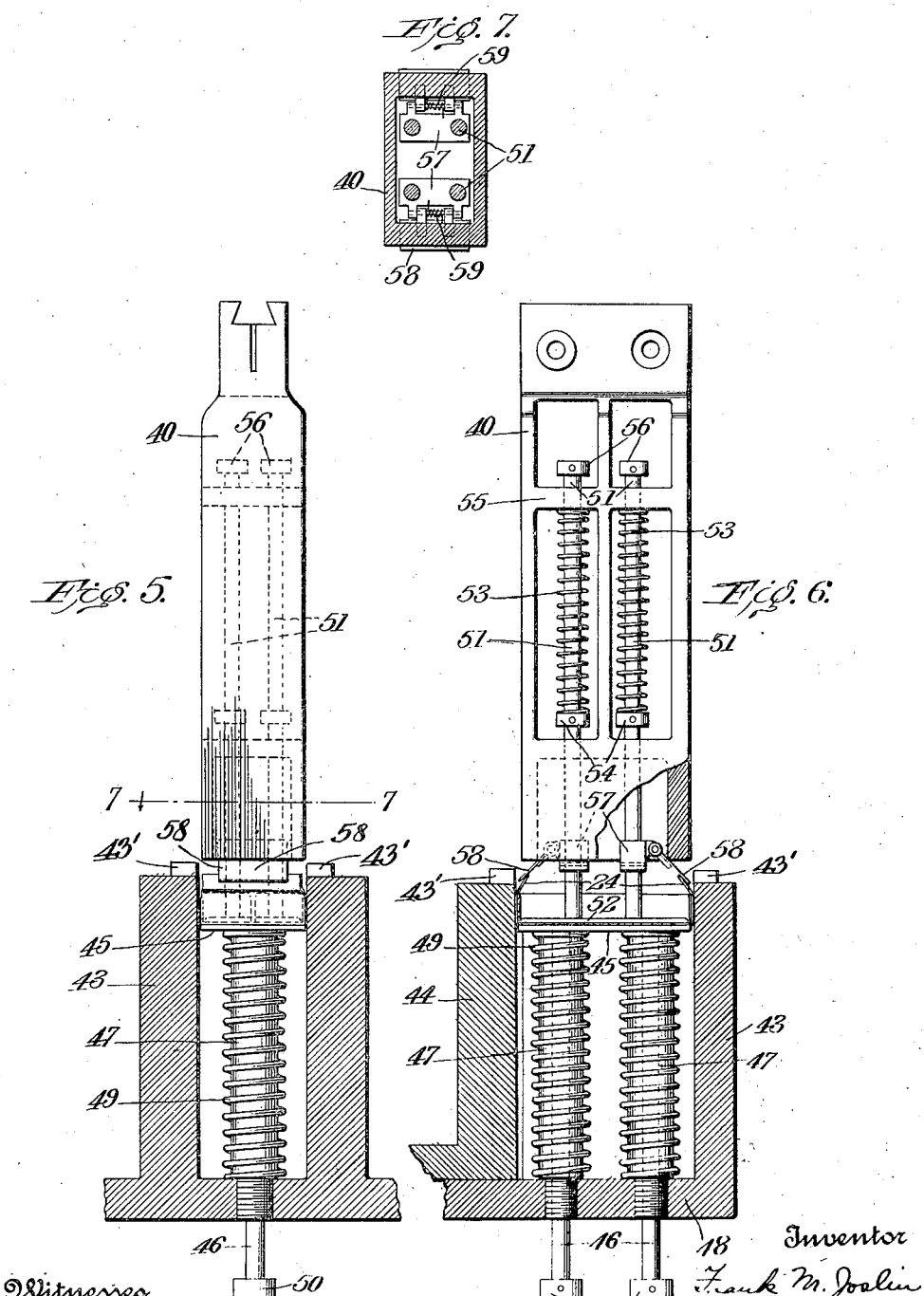

UNITED STATES PATENT OFFICE.

FRANK M. JOSLIN, OF AMSTERDAM, NEW YORK, ASSIGNOR TO INMAN MANUFACTURING COMPANY, INC., OF AMSTERDAM, NEW YORK, A CORPORATION OF NEW YORK.

PAPER-BOX MACHINE.

1,356,771.  Specification of Letters Patent.  Patented Oct. 26, 1920.

Application filed December 26, 1914. Serial No. 879,122.

*To all whom it may concern:*

Be it known that I, FRANK M. JOSLIN, a citizen of the United States, and resident of Amsterdam, county of Montgomery, State of New York, have invented certain new and useful Improvements in Paper-Box Machines, of which the following is a specification.

This invention relates to machines for making boxes and more particularly to machines for making paper boxes.

It is the object of the invention to provide a machine for automatically producing trays having reinforced ends formed by doubling back upon these ends extensions provided along the top thereof. It is also preferable to have extensions on the adjacent sides of the tray, which extensions are overlapped with the ends and inclosed by folding or bending the top extensions of the ends over them.

The novel features of the invention will be apparent from the following description taken in connection with the accompanying drawings, in which, Figure 1 is a side elevation of a machine embodying the invention;

Fig. 2 is a transverse section on the line 2—2 of Fig. 1;

Fig. 3 is a plan view of the pasting mechanism;

Fig. 4 is a vertical section on the line 4—4 of Fig. 3;

Fig. 5 is an end view of one of the plungers, the die coöperating therewith being shown in section;

Fig. 6 is a side view of the plunger shown in Fig. 5 with a part broken away and the die shown in section;

Fig. 7 is a section on the line 7—7 of Fig. 5;

Fig. 8 is a plan view of the material from which the boxes are made and showing the manner of forming the blanks;

Fig. 9 is a perspective view of a partially formed tray; and

Fig. 10 is a perspective view of the completed tray.

Referring to Figs. 8, 9 and 10, it will be seen that the tray, as formed in this machine, comprises the bottom portion 20, the side walls 21 and the end walls 22. The side walls 21 have end extensions 23 which, when the box is completed are arranged on the inner surface of the end walls 22. This is shown clearly in Fig. 9. The end walls 22 are provided with top extensions 24 which are folded over the extensions 23, as shown in Fig. 10. The extensions 23 are glued to the inner surface of the ends 22 and also to the extensions 24. In this way a tray is provided in which the ends are formed of three thicknesses of material with two layers of glue and when the glue hardens a very stiff end results which makes the tray especially adapted for use in boxes in which it is inclosed in a rectangular tube and the box is opened by pushing the tray endwise from the tube.

In the machine about to be described six trays are formed simultaneously and suitable dieing mechanism is provided for slotting the web of material $a$ at the points $b$. The completed blanks are shown at the left side of Fig. 8 and the dotted lines indicate the creases in the blank and the full lines indicate the cuts.

The dieing and creasing mechanism is indicated diagrammatically in Fig. 1 at A and the details of this mechanism may be of any preferred form, such as the form described and illustrated in the Inman Patent No. 1,067,253.

The portions of the blanks forming the end walls 22 and the extensions 24 thereof have an adhesive material, such as a suitable paste or glue, applied thereto and in accordance with the present invention I apply this adhesive material to the upper surface of the blank. It will be understood that suitable feeding mechanism for the web will be provided, as fully described in the aforesaid Inman Patent No. 1,067,253 and this feeding mechanism will give an intermittent forward movement to the web. In order to apply the glue to the upper surface of the blank there is arranged above the path of the web a glue receptacle 25 which is supported on brackets 26 and has arranged therein a roll 27 for feeding the glue from the receptacle. A roll 28, journaled in the brackets 26, has oppositely arranged pads 29 thereon adapted to engage the blanks and apply the glue thereto. The roll 28 has in coöperation therewith a roll 30 arranged below the web and which acts as a platen to support the web while the pads 29 are in engagement therewith. A roll 31, journaled in suitable brackets 31', engages the surface of the roll 27 and also the pads 29 as the roll 28 rotates and thus transfers the glue from the roll 27 to the pads 29. The pasting or gluing mechanism just described is intermittently operated by means of a chain 32 which is preferably driven by the web feeding mechanism (not shown) and which operatively engages a sprocket 33 on the shaft of the roll 30. The chain 32 also passes over a sprocket 34 which drives the feeding mechanism 35, this mechanism being similar to the corresponding feeding mechanism shown in the Inman patent above referred to. The rolls 28 and 31 are preferably driven from the roll 30 by means of suitable gearing 36, so that these rolls will be positively driven in accordance with the feeding movements of the web.

After passing through the pasting mechanism just described and also the feeding mechanism 35, the blanks are received by the forming mechanism B. The blanks are severed from the web in any suitable manner, such as illustrated in the aforesaid Inman patent. The forming mechanism comprises upright brackets 37 secured to the frame 38 of the machine and supporting a cross beam 39 on which the plungers 40 are reciprocated. The mechanism for guiding and supporting the plungers is preferably similar to that shown in the Inman Patent No. 1,067,253 and in view of the full description and illustration of this mechanism in said patent it is not believed that a detail description of the same is essential in this application. A portion of the actuating mechanism for the plungers is illustrated in Fig. 1 and comprises the reciprocating rack 41 which has its lower end connected with the rotating crank disk 42. The plungers 40 coöperate with dies 43, these dies having movable sides 44 and a yieldable bottom 45. The dies 43 and movable sides 44 thereof are provided, at the corners of the blank opening, with blocks 43' which are generally similar to the blocks $n^3$ of the Inman Patent No. 996,086 and coöperate with the plunger in the manner hereinafter described. The details of the plungers and dies are shown in Figs. 5, 6 and 7 and the normal position of the yieldable bottom 45 of the dies is substantially on a level with the top of the side walls of the dies. In Figs. 5 and 6 the bottom 45 is shown in the depressed position. The bottom 45 has secured thereto a pair of vertical slide rods 46 which are arranged in tubular guides 47 secured to the stationary bottom wall 48 of the dies. These tubular guides 47 have their upper ends so positioned as to be engaged by the yieldable bottom 45 to limit the downward movement of the latter, as shown in Figs. 5 and 6. Springs 49 are coiled about the guides 47 and normally tend to press the bottom 45 upwardly, the upward motion being limited by collars 50 on the lower ends of the rods 46, these collars engaging the underside of the wall 48.

The plungers 40 each comprise a hollow body portion in which rods 51 are slidably supported. These rods have secured to the lower ends thereof a plate 52 which serves as the bottom wall of the plunger. Springs 53 are coiled about the rods 51 and engage collars 54 on the rods and a partition 55 across the plunger and thus normally press the rods downwardly, the downward movement being limited by the engagement of the collars 56 with the upper surface of the partition 55. There are also secured on the rods 51 brackets 57 to which are pivotally connected the wings 58. These wings have horizontal pivots, and springs 59 are provided for swinging these wings outwardly from the position shown in Fig. 6.

The springs 53 have greater tension than the springs 49 so that when the plunger descends and the plate 52 engages the plate 45, the latter will yield. When the plunger is in the elevated position, the springs 53 force the rods 51 downwardly to a position where the collars 56 engage the partition 55 and in this position the wings 58 stand in a substantially horizontal position.

The operation of the forming mechanism is as follows:

The blanks are fed to a position directly over the die 43 and the plunger descends and the portion of the blank which forms the bottom of the box is engaged by the plates 45 and 52 and the blank carried into the die to the position shown in Fig. 6, the blocks 43' turning the extensions 23 against the inner sides of the end walls of the box so that as the plunger descends the extensions 23 will be arranged as shown in Fig. 9. On account of the springs 53 being of greater tension than the springs 49 the latter yield when the plate 52 engages the blank. The plate 45 being, in Fig. 6, at the limit of its downward movement, the movement of the plate 52 will be interrupted and the plunger body will then move independently, the springs 53 being thereby compressed. As the plunger body descends while the rods 51 are held stationary, it pushes the wings 58 downwardly so that they swing about their pivotal connections with the brackets 57 and engage the extensions 24 of the blank and swing these extensions inwardly to a substantially horizontal position. The plunger body continues its downward movement and, engaging the extensions 24, carries the latter to their final position, shown in Fig. 10. The limit of the downward movement of the plunger body is slightly above the plate 52 and after the plunger body reaches this limit the movable side 44 of the die is moved against the box so as to compress the overlapped portions, forming the end walls of the box, together. The movable side 44 is actuated by the toggle mechanism 60 which is preferably of the type shown in the Inman patent above referred to.

After the overlapped portions of the box have been pressed together, by the movable side 44 of the die, the latter is returned to its initial position and the plunger withdrawn. At first only the plunger body moves upwardly until the collars 56 engage the partition 55 and then the plate 52 is withdrawn. As the plate 52 recedes the springs 49 force the plate 45 and the box upwardly so as to carry the box out of the die. The plate 52 continues its upward movement until it reaches the position shown in Fig. 2.

A bar 61, which serves as a rake to remove the finished boxes, is arranged above the dies, as shown in Fig. 2, and has connected with the opposite ends thereof rods 62 which are also connected with arms 63 on a rock shaft 64. The rock shaft 64 carries an arm 65 having a roller 66 on the lower end thereof and arranged to be engaged by a rotating cam 67. The cam 67 is mounted on a shaft 68 which is driven by any suitable mechanism, in timed relation with the movements of the plungers so that the rake will operate to remove the finished boxes after each upward movement of the plungers.

It is evident that the invention may be embodied in other forms of mechanism than that shown and described and therefore I do not wish to be limited to the exact details shown.

Having described the invention what is claimed is:

1. In a paper box machine having means for feeding the material, suitable dieing and creasing mechanism for producing box blanks with opposite side walls having end extensions and one or more side walls having a top extension and means for applying an adhesive; the improvement which consists of a coöperating plunger and die adapted to bend the side walls of the blank into position with the said end extension arranged against adjoining side walls, and positively operated means carried by the plunger for bending said top extension back over said end extension whereby the box is formed by a single stroke of the plunger.

2. In a machine adapted to form boxes from blanks with opposite side walls having end extensions and one or more side walls having a top extension; the improvement which consists of a die, a plunger coöperating with said die having a yieldable bottom, and one or more laterally moving parts carried by said plunger and positively operated to bend the said top extensions whereby the box is formed in a single stroke of the plunger.

3. In a machine adapted to form boxes from blanks with opposite side walls having end extensions and one or more side walls having a top extension; the improvement which consists of a die having a yieldable bottom, a plunger coöperating with said die and having a yieldable bottom, and one or more pivoted wings on said plunger arranged to be swung laterally as the plunger moves toward said die to bend the said top extensions whereby the box is formed in a single stroke of the plunger.

4. In a machine of the class described, the combination of a forming die and a plunger coöperating therewith, said plunger comprising a body portion, a yieldable bottom therefor, and one or more pivoted wings arranged to be swung by a relative movement of said body portion and bottom.

5. In a machine of the class described, the combination of a forming die and a plunger coöperating therewith, said plunger comprising a body portion, a yieldable bottom therefor and one or more pivoted wings mounted to move with the bottom and arranged to be engaged by the body portion and swung thereby when the bottom is held stationary and the body portion moves toward said die.

6. In a machine of the class described, the combination of a forming die and a plunger coöperating therewith, said plunger comprising a hollow body portion, a yieldable bottom carried thereby, spring means for normally holding the bottom, one or more wings pivotally supported to move with the bottom and arranged to be engaged by the body portion and swung thereby when the bottom is held stationary and the body portion moves toward said die, and spring means for swinging said wings in opposite direction.

7. In a machine of the class described, the combination of a forming die and a plunger coöperating therewith, said plunger comprising a hollow body portion, a yieldable bottom therefor, spring means for normally holding said bottom, a pair of oppositely arranged wings pivotally supported to move with the bottom and normally held in position to be engaged by said body portion and swung inwardly thereby when it moves, relatively to the bottom, toward the die, and spring means for swinging said wings in the opposite direction.

8. In a machine of the class described, the combination of a forming die having a yieldable bottom, and a plunger coöperating with the die, said plunger comprising a body portion, a yieldable bottom therefor adapted to engage the yieldable bottom of the die and move the latter, one or more pivoted wings adapted to be engaged by the plunger body, and swung inwardly when the latter moves, relatively to the bottom, toward the die.

9. In a machine of the class described, the combination of a forming die having a yieldable bottom, means for limiting the extent of the yielding movement of said bottom and a plunger coöperating with said die, said plunger comprising a body portion, a yieldable bottom therefor adapted to engage the bottom of said die and move the latter against said limiting means, and a pair of wings pivotally supported for movement with the plunger bottom and adapted to be swung by the plunger body by the movement of the latter toward the die after the bottom of the die has reached the limit of its yielding movement.

In testimony whereof I affix my signature in presence of two witnesses.

FRANK M. JOSLIN.

Witnesses:
JAMES W. FERGUSON,
ROBERT G. HAWKINS.